United States Patent [19]

Hartzler

[11] 4,333,523
[45] Jun. 8, 1982

[54] REFLUX CONDENSER
[75] Inventor: Harold E. Hartzler, Goshen, Ind.
[73] Assignee: Miles Laboratories, Inc., Elkhart, Ind.
[21] Appl. No.: 90,323
[22] Filed: Nov. 1, 1979
[51] Int. Cl.³ .............................................. F28B 1/00
[52] U.S. Cl. ..................................... 165/73; 165/111; 202/163
[58] Field of Search ................. 165/73, 110, 111, 154; 202/161, 185 D, DIG. 2, 163; 422/101

[56] References Cited
U.S. PATENT DOCUMENTS
2,359,128  9/1944  Leibuff .
3,107,205 10/1963  Moran et al. .
3,334,025  8/1967  Reid .............................. 203/DIG. 2
4,089,749  5/1978  Karamin .

FOREIGN PATENT DOCUMENTS
119502  6/1900  Fed. Rep. of Germany ...... 422/101
1027146 3/1958  Fed. Rep. of Germany ...... 202/163
64900  7/1955  France ................................. 165/73

Primary Examiner—Samuel Scott
Assistant Examiner—Theophil W. Streule, Jr.
Attorney, Agent, or Firm—Jerome L. Jeffers

[57] ABSTRACT

Disclosed is a novel apparatus for use in the rapid refluxing of low boiling liquids. The apparatus comprises a central chamber for the reception of hot gases from a reaction vessel, the chamber being surrounded by a cooling jacket. The central chamber comprises a lower primary condenser of 2 or more bulbous portions connected to and in fluid communication with each other and with a curvilinear column serving as a secondary condenser.

9 Claims, 1 Drawing Figure

REFLUX CONDENSER

BACKGROUND OF THE INVENTION

This invention relates to an improved condenser particularly of the type used in standard experimentation in laboratories where a reaction is encouraged to proceed by refluxing a liquid solvent for the reaction constituents during a chemical process requiring heat. Such condensers are usually formed with a central tube through which the hot reaction liquors surge and fluctuate, which tube is surrounded by a jacket for the circulation of a cooling liquid. The lower end of the central tube terminates in a stem which communicates with the hot liquids through a ground glass connection or sometimes a rubber or cork stopper situated in the mouth of the reaction flask.

The central tube, which is typically made of glass or Pyrex, is commonly curvilinear, for example, helical, in configuration. The helical configuration is an efficient design for the refluxing of fairly low boiling liquids but can be problematical, i.e., lead to flooding, when the experimentation requires the blowing of a gas through the column, such as when argon or nitrogen is used to maintain an inert atmosphere. Flooding occurs when the condensed liquid fills the upper part of the column resulting in the buildup of gas pressure which blows the liquid through the open top of the column. The problem of flooding can be alleviated by using a central tube which comprises a series of bulbous portions or sections in fluid communication with each other. The diameter of the bulbous sections is sufficiently large to prevent their filling up with condensed liquid and causing the pressure buildup which results in flooding. However, this configuration is less efficient for condensing purposes and is, therefore, by itself not always suitable for the rapid refluxing of a low boiling solvent.

SUMMARY OF THE INVENTION

The present invention is an improved reflux apparatus having a central chamber for the reception of hot gases from a reaction vessel. The chamber, which is designed to be open to the atmosphere at one end and removably connected to and in fluid communication with the reaction vessel at the other end, is surrounded by a cooling jacket for the reception of a liquid for cooling and condensing hot gases surging through the chamber from the reaction vessel. The improvement resides in the use of a central chamber which comprises:
   (a) a lower primary condenser formed of two or more bulbous portions connected to and in fluid communication with each other and with,
   (b) an upper secondary condenser formed of a curvilinear column.

DETAILED DESCRIPTION

Figure 1:
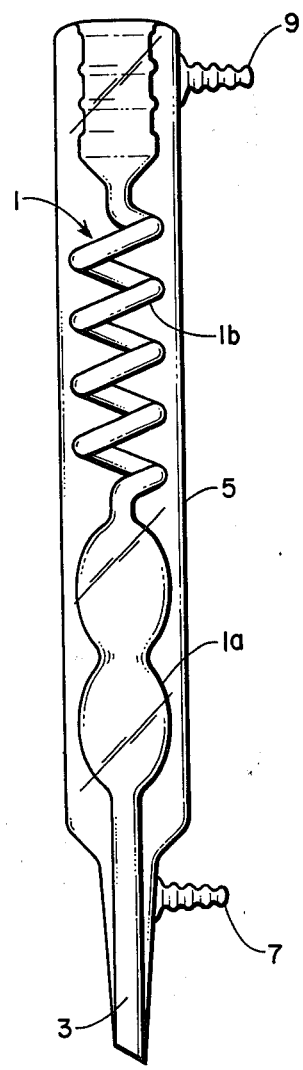

The design of the presently disclosed reflux condenser is more fully illustrated by the drawing. Referring to the drawing, the central Chamber (1) is comprised of a primary Condenser (1a) and a secondary Condenser (1b). The primary Condenser, which consists of two or more bulbous portions, serves the function of condensing the bulk of the vapors emanating from the reaction vessel (not shown) which is in fluid communication with the condenser through the standard tapered joint 3 at the lower end of the condenser. The use of two or more bulbous portions in the primary condenser provides significant advantages over the use of a single faceted large bore primary condenser having the same surface area. The advantage is in terms of condensation efficiency, since when the vapors pass through the constricted zone at the juncture of the bulbous portions, turbulence results causing the gas to have greater contact with the condenser walls. Furthermore, a single zone primary condenser having a condensing capacity equivalent to the device disclosed and claimed herein would have to be so large that it would be inconvenient for use in many laboratory operations. The size of the primary condenser is not critical; its diameter, height and number of bulbous portions will depend on the solvent being refluxed and the reflux rate. Typically a bulb having a major dimension of from 1 to 2 inches and the use of two bulbs will suffice to achieve the desired function of the primary condenser. The ratio of the widest latitudinal diameter of the bulbous portions and the diameter of the opening at their juncture with each other should be from about 1½:1 to 4:1 in order to cause sufficient turbulence in the gas flow passing through the primary condenser. When it is desired to reflux low boiling solvents at a very high rate, a primary condenser having additional bulbous portions is preferred.

The secondary condenser is preferably in the form of a helical tube or column which is integral with and in fluid communication with the primary condenser. This condenser is more efficient than the primary condenser and condenses those vapors which pass through it, returning them to the primary condenser. As with the primary condenser, the diameter and length of the secondary condenser is not critical and will depend on the nature of the solvent to be refluxed and the desired reflux rate. Typically a helical column having a bore of from ¼ to ½ inch and a length of from 15 to 30 inches is satisfactory. The curvature of this column will normally be such that the resulting helix is 4 to 8 inches in height.

The central Chamber 1 is surrounded by a cooling Jacket 5 having cooling liquid inlet 7 and a cooling liquid outlet 9.

In use, the condenser is connected to the top of the reaction vessel, such as by means of a holed cork stopper adapted to provide a vapor-tight connection, or preferably by use of a ground glass fitting designed to mate the standard tapered joint to the neck of the reaction vessel. The bulk of the vapors which boil up from the reaction vessel are condensed in the primary condenser (bulbous portions) and are returned to the vessel without hold-up. Uncondensed vapors continue into the secondary condenser (helical column) where they are condensed and returned to the primary condenser and thence to the reaction vessel.

In the use of conventional condensers consisting of only bulbous portions, instances can occur in which all the vapors are not condensed and some escape through the open top, so that in time the reaction may lose its solvent. On the other hand, if the condenser consists only of a helical column, the reflux rate may be so high that condensed liquid is blown out of the open top and again the reaction may lose its solvent. These situations are exacerbated when an inert atmosphere is maintained by blowing a stream of inert gas through the reaction vessel and then out the condenser. The foregoing problems are overcome by use of the apparatus of this invention.

In a specific embodiment of this invention, a central chamber was formulated from Pyrex laboratory glassware. The central chamber comprised a primary condenser of two bulbous areas which were in fluid communication with each other and with a secondary condenser in the form of a helical column. The bulbs of the primary condenser were each 1¼ inches in latitudinal diameter at their widest point and 1¾ inches long. The diameter of the opening at the juncture between the bulbous portions was approximately ½ inch providing a ratio of diameters of about 2:1. The secondary condenser was made of a 20 inch length of ¼ inch bore tubing which was spiraled to form a helix 5 inches high and having 5 turns. Calculation of the surface areas of the primary and secondary condensers indicated that the ratio of surface area of the secondary condenser to that of the primary condenser was approximately 3:1. Since the secondary condenser is designed to be more efficient than the primary, its surface area should be greater than that of the primary condenser. Typically, a ratio of surface areas of from 2:1 to 4:1 is desirable to accomplish the purpose of this invention.

The central chamber, described above, was placed in a 2 inch diameter, 12 inch long cooling jacket having an inlet for coolant and an outlet as shown in the drawing. The device was inserted into the outlet of a 500 ml round bottomed flask by way of a ground glass fitting.

The above described apparatus was employed in an experiment in which anhydrous ammonia was bubbled rapidly through a refluxing reaction mixture using light petroleum ether (b.p. 50°–70° C.) as solvent. The contents of the reaction flask were refluxed for 18 hours with continuous flow of cold water through the cooling jacket during which period no solvent was lost due to either flooding or evaporation.

The foregoing results are contrasted with the following experiments using prior art devices. All parameters were the same as previously described except for the use of different condenser configurations. In one instance, the central chamber consisted of 5 bulbous portions (each 1¼ inches in latitudinal diameter at their widest point by 1¾ inches long) which, when the necessary joints (each having about a ½ inch bore) are taken into consideration, is the maximum number which will fit into a 12 inch cooling jacket. Use of this apparatus resulted in loss of all solvent during 18 hours of refluxing. In another instance, the central chamber consisted of a 40 inch length of ¼ inch bore glass tubing which was spiraled to form a helix 10 inches high and having 10 turns. Use of this device resulted in substantial flooding, under the previously described conditions, which caused significant loss of solvent.

What is claimed is:

1. In combination with a reflux apparatus having a central chamber for the reception of hot gases from a reaction vessel, which central chamber is designed to be open to the atmosphere at one end and removably connected to and in gaseous communication with the reaction vessel at the other end and is surrounded by a cooling jacket for flow therethrough of a cooling liquid for cooling and condensing hot gases surging through the central chamber from the reaction vessel, the improvement wherein the central chamber comprises:
    (a) a lower primary condenser formed of 2 or more bulbous portions connected to and in fluid communication with each other and with,
    (b) an upper secondary condenser formed of a curvilinear column.

2. The improved reflux condenser of claim 1 wherein the primary condenser's bulbous portions have a major dimension from 1 to 2 inches.

3. The improved reflux condenser of claim 1 wherein the curvilinear column has a bore of from ¼ inch to ½ inch and is 15 to 30 inches in length.

4. The condenser of claim 3 wherein the column is in the form of a helix 4 to 8 inches in height.

5. The improved reflux condenser of claim 1 wherein the ratio of surface area of the secondary condenser to that of the primary condenser is from 2:1 to 4:1.

6. The improved condenser of claim 5 wherein the ratio is approximately 3:1.

7. The improved reflux condenser of claim 1 wherein the ratio of the widest latitudinal diameter of the bulbous portions to the diameter of the opening at their juncture is from 1½:1 to 4:1.

8. The condenser of claim 7 wherein the ratio is about 2:1.

9. In combination with a reflux apparatus having a central chamber for the reception of hot gases from a reaction vessel, which central chamber is designed to be open to the atmosphere at one end and removably connected to and in gaseous communication with the reaction vessel at the other end and is surrounded by a cooling jacket for flow therethrough of a cooling liquid for cooling and condensing hot gases surging through the central chamber from the reaction vessel, the improvement wherein the central chamber comprises:
    (a) a lower primary condenser formed of 2 or more bulbous portions connected to and in fluid communication with each other, said primary condenser being further defined in that the bulbous portions have a major dimension of from 1 to 2 inches and the ratio of the widest latitudinal diameter of the bulbous portions to the diameter of the opening at their juncture is about 2:1 and,
    (b) an upper secondary condenser formed of a helical column which has a bore of from ¼ to ½ inches which is the result of turning a 15 inch to 30 inch length of tubing into a helix having a height of from 4 to 8 inches, said central chamber being further defined in that,
    (c) the ratio of the surface area of the secondary condenser to that of the primary condenser is approximately 3:1.

* * * * *